US009532208B2

(12) United States Patent
Camilleri et al.

(10) Patent No.: US 9,532,208 B2
(45) Date of Patent: *Dec. 27, 2016

(54) METHOD OF AND APPARATUS FOR INTERFACING AND CONNECTING A WIRELESS DEVICE AND A WIRELESS NETWORK USING A SUBSCRIBER IDENTITY MODULE HAVING PLURAL IMSI ASSOCIATES WITH DIFFERENT NETWORK OPERATORS (71) Applicant: SHOO 533 LIMITED, Buckinghamshire (GB)

(72) Inventors: Michael Camilleri, Berkshire (GB); Jose Luis Merino Gonzalez, Malaga (ES)

(73) Assignee: SHOO 533 LIMITED, Buckinghamshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,998

(22) Filed: May 23, 2013

(65) Prior Publication Data
US 2013/0260750 A1    Oct. 3, 2013

Related U.S. Application Data (60) Continuation of application No. 13/476,099, filed on May 21, 2012, now Pat. No. 8,467,831, which is a
(Continued)

(30) Foreign Application Priority Data

Mar. 7, 2006  (GB) ..................... 0604573

(51) Int. Cl.
H04B 1/38      (2015.01)
H04W 8/18     (2009.01)
(Continued)

(52) U.S. Cl.
CPC ............. *H04W 8/183* (2013.01); *H04W 8/26* (2013.01); *H04W 48/18* (2013.01)

(58) Field of Classification Search
CPC ......... H04W 8/26; H04W 8/183; H04W 48/18
(Continued)

(56) References Cited

U.S. PATENT DOCUMENTS 6,185,436 B1 *  2/2001  Vu ................................ 455/558
6,641,049 B2 * 11/2003  Luu .............................. 235/492
(Continued)

OTHER PUBLICATIONS

'List of Mobile Country or Geographical Area Codes (Position on Jan. 1, 2004),' ITU-T Telecommunication Standardization Sector of ITU, Complement to ITU-T Recommendation E.212 (Nov. 1998), Annex to ITU OPeraitonal Bulletin No. 803-1.I.2004 (Geneva 2004).

*Primary Examiner* — Tuan Pham
(74) *Attorney, Agent, or Firm* — Saul Ewing LLP (57) ABSTRACT

A wireless device includes a single SIM, plus an application module adapted to enable the device to operate as though it included two or more different SIMs. The module, referred to as a 'proprietary applications module' (PAM) is connected to, or built into, a wireless device (WD). The PAM is capable of switching all incoming traffic by associating the WD to one specific subscriber identity sub-module, referred to as "Local SIM" (LS). It can also switch or re-route all outgoing traffic by associating the same WD with a different subscriber identity sub-module, typically a "Roaming SIM" (RS). In a preferred embodiment, the PAM, RS and LS are built-into a single SIM for use in a WD; alternatively the PAM is built-into a WD and the RS and LS are built-into the single SIM.

15 Claims, 4 Drawing Sheets

Related U.S. Application Data division of application No. 12/281,844, filed as application No. PCT/GB2007/000799 on Mar. 7, 2007, now Pat. No. 8,185,156.

(51) Int. Cl.
*H04W 8/26* (2009.01)
*H04W 48/18* (2009.01)

(58) Field of Classification Search
USPC ............ 455/558, 428, 432.1, 436, 439, 442, 445,455/552.1
See application file for complete search history.

(56) References Cited

U.S. PATENT DOCUMENTS

| | | | |
|---|---|---|---|
| 6,738,622 B1* | 5/2004 | Stadelmann et al. | 455/435.1 |
| 8,185,156 B2* | 5/2012 | Camilleri et al. | 455/558 |
| 8,467,831 B2* | 6/2013 | Camilleri et al. | 455/558 |
| 2002/0006808 A1* | 1/2002 | Onaka et al. | 455/550 |
| 2004/0252816 A1* | 12/2004 | Nicolas | G06Q 30/02 379/92.01 |
| 2004/0266382 A1* | 12/2004 | Lindstedt | 455/252.1 |
| 2005/0083877 A1* | 4/2005 | Zilliacus et al. | 370/328 |

* cited by examiner

METHOD OF AND APPARATUS FOR INTERFACING AND CONNECTING A WIRELESS DEVICE AND A WIRELESS NETWORK USING A SUBSCRIBER IDENTITY MODULE HAVING PLURAL IMSI ASSOCIATES WITH DIFFERENT NETWORK OPERATORS

CROSS REFERENCE TO RELATED APPLICATIONS

This application is a continuation of U.S. application Ser. No. 13/476,099, filed May 21, 2012, which is a divisional of U.S. application Ser. No. 12/281,844, filed Jan. 8, 2009, which claims the priority of PCT/GB2007/000799 filed on Mar. 7, 2007, which claims priority to GB 0604573, filed Mar. 7, 2006, the entire contents of which are hereby incorporated herein by reference.

FIELD OF THE INVENTION

This invention relates to a method and apparatus for interfacing and connecting a wireless device and a wireless network using a subscriber identity module (SIM). It enables in-coming and out-going SMS, voice and data calls to be routed cost effectively and flexibly.

BACKGROUND OF THE INVENTION

Wireless devices can now handle voice and/or data, allowing simplex and/or duplex voice calls, video calls, text messaging, and internet browsing. Some wireless communication devices can now handle voice-over-internet-protocol (VoIP) calls, and others are able to handle multimedia (voice, video, graphics) calls through wireless networks and/or through wireless networks connected to the internet or media servers.

Different types of calls, initiated by wireless devices, can be restricted for some or most of their outgoing traffic; for example voice and data calls, as well as internet web browsing, can be restricted to those call tariffs made available by the wireless network(s) that is subscribed to. Those wireless networks could be operated by traditional wireless network operators or so called virtual network operators. The restrictions can even limit which web servers the user is actually allowed to access. In most or all cases the restrictions will limit the users in their home country to only one wireless network, i.e. the home wireless network to which the user is subscribed to.

Users of wireless devices subscribed to a specific wireless network in their home country, may however wish to have a choice of call set-up route(s), and also have the choice of viewing any web server or web-page that they desire, and to initiate their outgoing calls at the tariff of their choice and through any of the wireless network(s) available in their home country as well as when roaming abroad. This would give each wireless device user the freedom to choose the cheapest option for each call set-up route for any outgoing traffic, such as outgoing -SMS, -voice call, -data call.

There are several ways of achieving this, but all have drawbacks.

It is known to provide a wireless device (e.g. a mobile telephone) with 2 separate SIMs, each associated with a different network operator; the 2 separate SIMs sometimes need to be cut down to fit a single SIM reader, or else a special carrier for two SIMs is provided that itself connects to a conventional SIM package. These devices are sometimes called 'ghost SIMs'. So, for example, a person who frequently travels between the UK and the US would have a single mobile telephone that he could use in both countries, fitted with a dual SIM 'ghost'. If his home mobile operator is based in the UK, he would normally pay roaming charges when he makes calls from the US; call costs can be 10× greater from the US because of this. But with a dual SIM 'ghost' on his mobile telephone, the user can toggle between SIMs by repeatedly turning the device off/on. So he can use a SIM from a US operator when in the US and a SIM from a UK operator when in the UK. But that means that incoming calls to the UK telephone number will go unanswered when the US SIM is being used, and vice versa, which is inconvenient. The user could simply toggle the phone to the US SIM only when he needs to make a call from the US, and then remember to toggle back afterwards. But that is inconvenient. And the user also has to obtain the 2 separate SIMs in the first place, which can again be inconvenient.

He could alternatively keep 2 different mobile telephones, one for use in the UK and one for the US, with each associated with a UK and US operator respectively. Then, no roaming charges will be paid when he calls from the US, because he uses the mobile telephone associated with the US operator. But having 2 different mobile telephones is costly and inconvenient, especially as people will no doubt call him on his UK mobile telephone number when he is in the US, so he would need to have both devices constantly at hand when traveling in the US.

Another solution is to have a conventional mobile telephone using just a single SIM, but to have 2 different SIMs, and to physically swap the SIM from a UK operator into the device when in the UK, and swap in a SIM from a US operator when in the US. But that is very inconvenient, and can mean that calls to the UK telephone number will just divert to voicemail when the US SIM is in use, and vice versa when the UK SIM is in use.

Before summarising the invention, we will explain some background terms. The IMSI is a unique non-dialable number allocated to each mobile subscriber that identifies the subscriber and his or her operator subscription. The IMSI is stored in the Subscriber Identity Module (SIM). The IMSI is made up of three parts (1) the mobile country code (MCC) consisting of three digits, (2) the Mobile Network Code (MNC) consisting of two digits, and (3) the Mobile Subscriber Identity Number (MSIN) with up to 10 digits.

A Home Location Register (HLR) is a database that contains mobile subscriber information for all subscribers to an operator. A Visitor Location Register (VLR) is a database owned and maintained by a mobile operator. It contains temporary information about mobile subscribers that are currently located in a geographic area served by that mobile operator, but whose Home Location Register (HLR) is elsewhere.

HLR subscriber information includes the International Mobile Subscriber Identity (IMSI), service subscription information, location information (the identity of the currently serving Visitor Location Register (VLR) to enable the routing of mobile-terminated calls), service restrictions and supplementary services information. The HLR also initiates transactions with VLRs to complete incoming calls and to update subscriber data.

When a mobile subscriber roams away from his home location and into a remote location (typically to a different country), SS7 messages are used to obtain information about the subscriber from the HLR, and to create a temporary record for the subscriber in the VLR. There is usually one VLR per operator. The VLR automatically updates the HLR with the new location information, which it does using an SS7 Location Update Request Message. The Location Update Message is routed to the HLR through the SS7 network, based on the global title translation of the IMSI that is stored within the SCCP Called Party Address portion of the message. The HLR responds with a message that informs the VLR whether the subscriber should be provided service in the new location.

SUMMARY OF THE INVENTION

The present invention is a wireless device including a single SIM, the wireless device further including an application module adapted to enable the device to operate as though it included two or more different SIMs.

The application module may be adapted to switch the single SIM between (a) operating as a local SIM and (b) operating as a roaming SIM. The application module can be a software module that is downloaded to the device.

The user can manually control the switching between the local SIM and roaming SIM operation; switching can for example be done by an end-user operating a switch, or an end-user interacting with an on-screen menu displayed on the device.

In one implementation, when the device is operating with a local SIM, it uses a Local SIM sub-module that is associated with a network operator 1 based in country A; when the device is operating with a roaming SIM, it uses a roaming SIM sub-module that is associated with a network operator 2 based in country B. The local SIM sub-module includes an IMSI number associated with a subscriber and operator 1. The roaming SIM sub-module includes an IMSI number associated with the subscriber and operator 2. Its standby mode is to use the local SIM sub-module so that incoming calls using the IMSI number associated with operator 1 are received. But the user can use the roaming SIM sub-module so that outgoing calls use the IMSI number associated with operator 2. The advantage to the user comes because the tariff associated with operator 2 for outgoing calls is lower than the tariff associated with operator 1 for outgoing calls; the tariff associated with operator 2 for outgoing calls made when the subscriber is outside country A can for instance be lower than the tariff associated with operator 1 for outgoing calls made when the subscriber is outside country A. The tariff associated with operator 2 for outgoing calls made when the subscriber is inside country A can also be lower than the tariff associated with operator 1 for outgoing calls made when the subscriber is inside country A. Operator 2 might also place fewer restrictions than operator 1, including restrictions on destination servers accessed. When a call terminates, the device reverts to its standby mode of using the local SIM sub-module.

The local SIM sub-module and the roaming SIM sub-module are sub-modules within the single SIM (so that, for example, the application module, although in the wireless device, is not part of the SIM itself). Alternatively, the application module, the local SIM sub-module and the roaming SIM sub-module are each sub-modules within the single SIM.

Other implementation features are that: the application module controls communication to a wireless network and includes one or more of the following sub-modules: SIM control unit; features control unit; local SIM sub-module, roaming SIM sub-module; external switch controlling the selection of either the local SIM or roaming SIM sub-modules. The SIM control unit enables the local SIM sub-module or roaming SIM sub-module to be selected. The features control unit enables the caller ID to be modified. The features control unit enables the roaming SIM sub-module to be selected when a user presses a predefined key on a wireless device in which the single SIM is used. The external switch allows the applications module to control the selection of the local SIM sub-module or the roaming SIM sub-module. The applications module selects the local SIM sub-module as a default when powered on. The SIM control unit stores a PIN associated with each of the local and roaming sub-modules and uses that PIN automatically to eliminate the need for manual entry of that PIN. The SIM control unit selects the local SIM sub-module as a default when powered on.

The present invention can enable communications with a mobile virtual network operator, virtual telecoms operator or a virtual telecoms provider. The wireless device itself can be a mobile telephone, wireless card, smart phone or wireless module.

Another aspect of the invention is a downloadable software based application module that, when running on a wireless device, results in that device being a device as defined above.

A further aspect is a method of communicating with a wireless network, comprising the step of using a wireless device as defined above.

A final aspect is a SIM including a local SIM sub-module with a first IMSI and a second SIM sub-module with a different IMSI, the SIM being switchable between either of the sub-modules. The SIM is physically packaged in the same package as a conventional SIM. The SIM may include an application module to control the switching. The SIM, when used in combination with a wireless device, renders that wireless device as a wireless device as defined above.

In a preferred implementation, a proprietary applications module (PAM) in the SIM is connected to, or built into, a wireless device (WD). The PAM is capable of switching all incoming traffic by associating the WD to one specific subscriber identity sub-module (SIM), referred to as "Local SIM" (LS). It can also switch or re-route all outgoing traffic by associating the same WD with a different subscriber identity sub-module (SIM), which we will call a "Roaming SIM" (RS). The PAM, RS and LS can be embedded into one single physical SIM.

The PAM establishes data communication between the WD and a wireless network (WN). Each time the WD powers-on, the PAM selects the Local SIM, which gives a location update to the home location register (HLR) attached to its local home wireless network (LHWN). This allows all incoming traffic to be associated with the Local SIM. The PAM can however switch from the Local SIM towards the Roaming SIM; the Roaming SIM then gives location updates to a visitor location register (VLR) attached to any of the available wireless networks (WN or WNn), associated with the Roaming SIM. This can be done any time the WD user chooses so manually (or, optionally, automatically). This is normally done prior to the WD user initiating outgoing traffic, such as outgoing voice and data calls and, optionally, also outgoing short message service (SMS).

This allows the WD to make use of any of the available local wireless networks. By associating the WD with the Roaming SIM, outgoing traffic will be billed at the roaming tariffs established between the home wireless network (RHWN) and each individual local wireless network (LHWN or LWN1 to LWNn). This can be much cheaper for the subscriber and can give greater flexibility—for example enabling a broader range of web servers to be used.

The PAM will, after ending each originated outgoing traffic session, switch (automatically or manually using an external switch) back to the Local SIM, which provides a location update to its home location register (HLR) attached to its local home wireless network (LHWN) when the WD is in its Local SIM home country. This allows the WD to receive any incoming traffic at no charge as 'calling-party-pays' is applicable to its local home wireless network (LHWN). Alternatively and optionally, when the WD is in a different country, the Local SIM is also still used; it sends location updates to a visitor location register (VLR) attached to a roaming wireless network (RWN). This allows the WD to receive any incoming traffic at the tariff rate established by its local home wireless network (LHWN).

But in essence, the WD user always has the option to choose which SIM operation (Local SIM or Roaming SIM) it will use for its incoming and/or outgoing traffic.

DETAILED DESCRIPTION OF THE DRAWINGS

Figure 1:
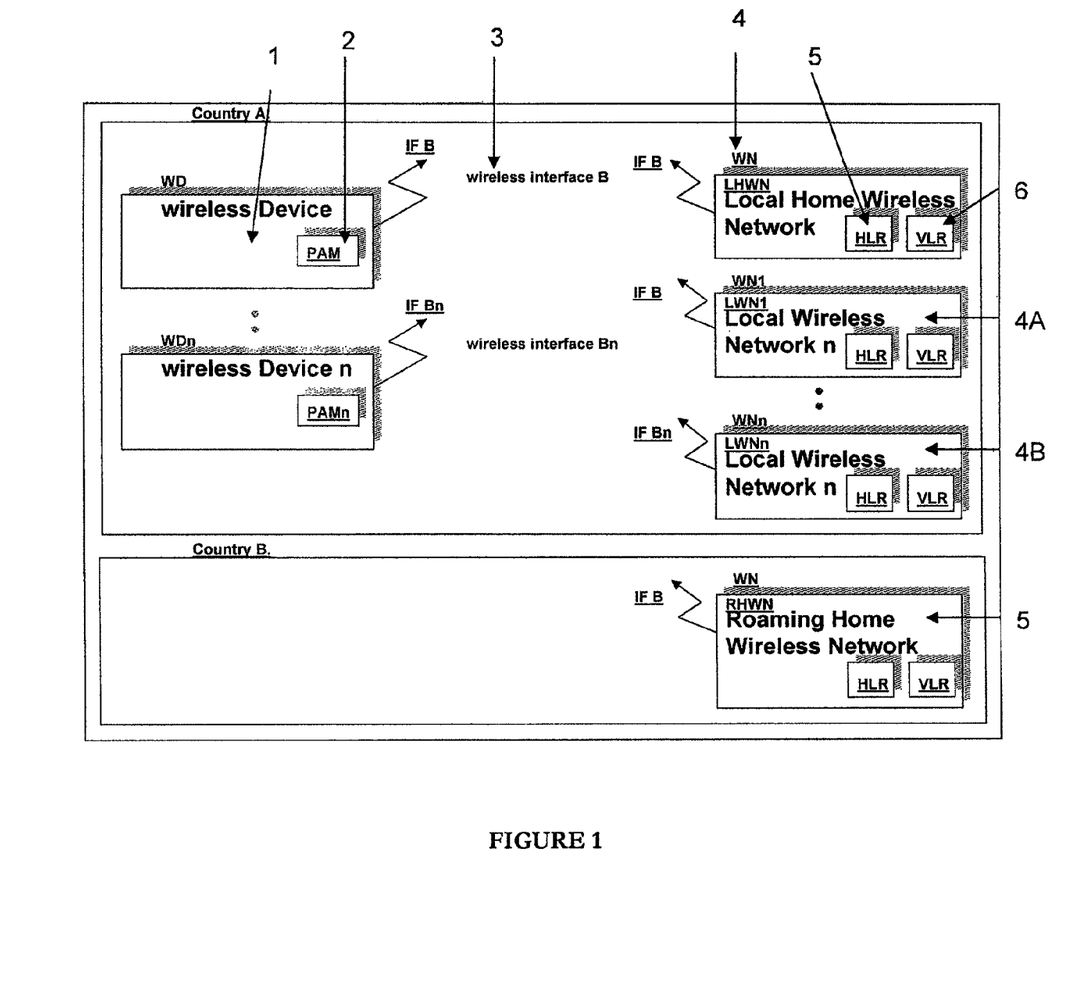
FIG. 1 is a block diagram of a communications system with wireless devices communicating through a wireless interface and a wireless network(s) in accordance with the present invention.

Specifically, FIG. 1 is a block diagram of a wireless communications system, which can be used to implement an embodiment of the present invention. For this exemplary embodiment, there is shown a wireless device (WD) 1, with a built-in PAM 2, and a wireless network which provides connection for voice and data communication between the WD and the wireless network through a wireless interface IF-B 3. The wireless interface IF-B 3 in turn allows connection to any communication device with a wired or wireless connection wired to such wireless networks. Examples of components in this system include, but are not limited to, a fixed network, an application server, a media server, a voice over IP network or even a different wireless network, or a multiple configuration of the previous. There can be multiple wireless devices (WD n), multiple wireless interfaces (IF-Bn), multiple wireless networks (WNn), multiple fixed networks, multiple application servers, a media servers, multiple voice over IP networks.

In FIG. 1, there is shown a wireless device (WD) 1, with a built-in PAM 2, and several wireless networks (WN, WNn) 4, 4A, 4B, such as a local home wireless network (LHWN) 4, additional different wireless networks (WN1, WNn) 4A, 4B called local wireless networks (LWN1, LWNn) 4A, 4B and a different wireless network (WN) called the roaming home wireless network (RHWN) 5.

The wireless device WD 1 has an embedded PAM 2. The WD 1 is configured in accordance with a combination of technologies used in the field of handheld wireless devices and personal digital handheld wireless devices, such as (but not limited to) wireless phones, cellular phones, mobile phones, hand held radio frequency digital communication devices, personal digital assistants and so called smart-phones, which can each communicate with the wireless networks as described.

A wireless network WN 4 is shown. The wireless network is configured in accordance with a combination of technologies used in the field of wireless digital communications networks; such as but not limited to GSM-GPRS-WAP based wireless networks, GSM-GPRS-WAP-EDGE based wireless networks, UMTS based wireless networks, PCS based wireless networks, DCS based wireless networks, TDMA based wireless networks, WiFi or WiMax based wireless networks.

The preferred embodiment of the present invention and its advantages will now be described. Essentially, in accordance with an embodiment of the present invention, we have a method and apparatus for interfacing and connecting a wireless device(s) 1 and a wireless network 4, 4A, 4B and 5 for in- and out-going traffic, such as SMS and/or voice and/or data call(s). The method and apparatus enable routing, interfacing and connecting a handheld wireless device and a wireless network. Calls can be set up in accordance with a user's own choice of routing to any 3rd party end user, connecting over wireless networks, fixed networks, servers or the Internet.

The WD 1 with a built-in PAM 2 establishes data communication between the WD 1 and a wireless network 4-5 coupled to a digital communication system associated with one of the Local SIM (LS) 21 or Roaming SIM (RS) 22 identities; both LS 21 and RS 22 are embedded into a single SIM, and are each defined by a unique IMSI number. As a first step, the PAM 2, 2n chooses either the Local SIM (LS) 21 or Roaming SIM (RS) 22 identity. The WD 1 provides location updates each time the PAM 2 (e.g. built into the WD) changes SIM identity (e.g. selects a different SIM sub-module, LS 21 or RS 22, each embedded into the single SIM, which itself resides in the WD 1. Each sub-module LS 21 and RS 22 is associated with a different IMSI and therefore network operator. WD 1 also provides a location update each time it changes wireless network name or wireless network country or region or state.

When the WD 1 is in the home country associated with the Local SIM (LS) 21, the PAM 2 establishes data communication between the WD 1 and a wireless network (WN) 4-5. As a first step, the PAM 2 selects the Local SIM 21 to provide location updates to its home location register (HLR) 6 attached to its local home wireless network (LHWN) 4, associated with the Local SIM 21. This occurs each time the WD 1 powers-on, allowing all incoming traffic to be associated with the Local SIM 21. The PAM 2 can switch from the Local SIM 21 to the Roaming SIM 22 (which involves changing the IMSI number declared by the WD 1) to give location updates to a visitor location register (VLR) 7 attached to any of the available wireless networks (WN or WNn) 4, 4A, 4B, associated with the Roaming SIM 22, any time the WD 1 user chooses. This choice is done manually or optionally automatically prior to any time the WD 1 user is about to initiate outgoing traffic, such as outgoing voice and/or data calls and optionally also outgoing SMS.

This allows the WD 1 to make use of any of the available local wireless networks 4, 4A, 4B, based in the home country of the LS 21; associating the WD 1 with the Roaming SIM 22 enables the outgoing traffic to be at the roaming tariffs established between the roaming home wireless network (RHWN) 5, based in a different country to the country of the LS 21, and each individual local wireless network (LHWN or LWN1 to LWNn) 4, 4A, 4B.

The PAM 2 will, after ending each originated outgoing traffic session, switch to the Local SIM (LS) 21 to provide location updates to its home location register (HLR) 6 attached to its local home wireless network (LHWN) 4 when the WD 1 is in its Local SIM 21 home country. Switching can be done automatically or manually by the user, through an internal user menu or an external switch. This switching allows the WD 1 to receive any incoming traffic at no charge as 'calling party pays' is applied by its local home wireless network (LHWN) 4. Alternatively and optionally, location updates can be made to a visitor location register (VLR) 7 attached to a roaming wireless network (RWN) 5 when the WD 1 is in a country different then the one associated with the LS, allowing the WD 1 to receive any incoming traffic at the tariff rate established by its local home wireless network (LHWN) 4 and the roaming wireless network for such incoming roaming calls. The WD 1 user always has the option to choose which of the SIM (Local SIM 21 or Roaming SIM 22) it will use for either or both of its incoming or its outgoing traffic.

Figure 2:
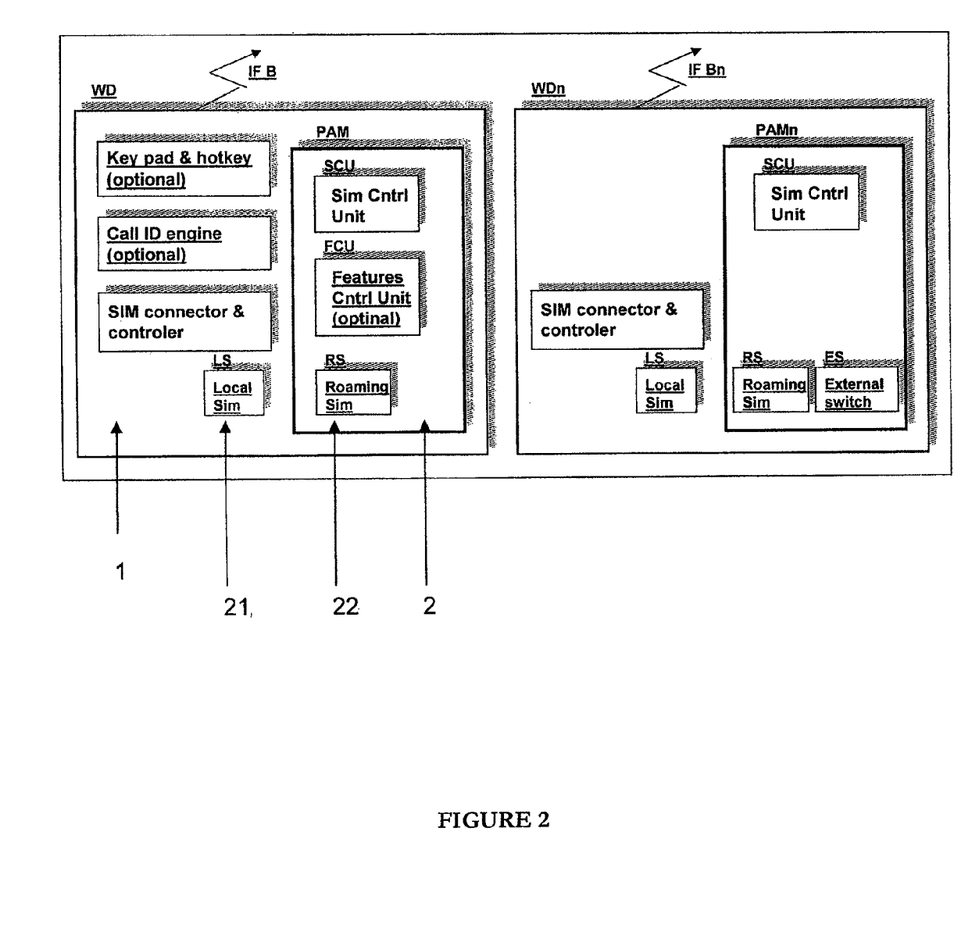
FIG. 2 shows two example implementations and some of the different combinations using the proprietary applications module (PAM).

FIG. 2 show two of the preferred integration embodiments of the proprietary application module (PAM) of the invention, which in the context of the foregoing are self explanatory, basically showing the integration of a PAM within a wireless device.

Figure 3:
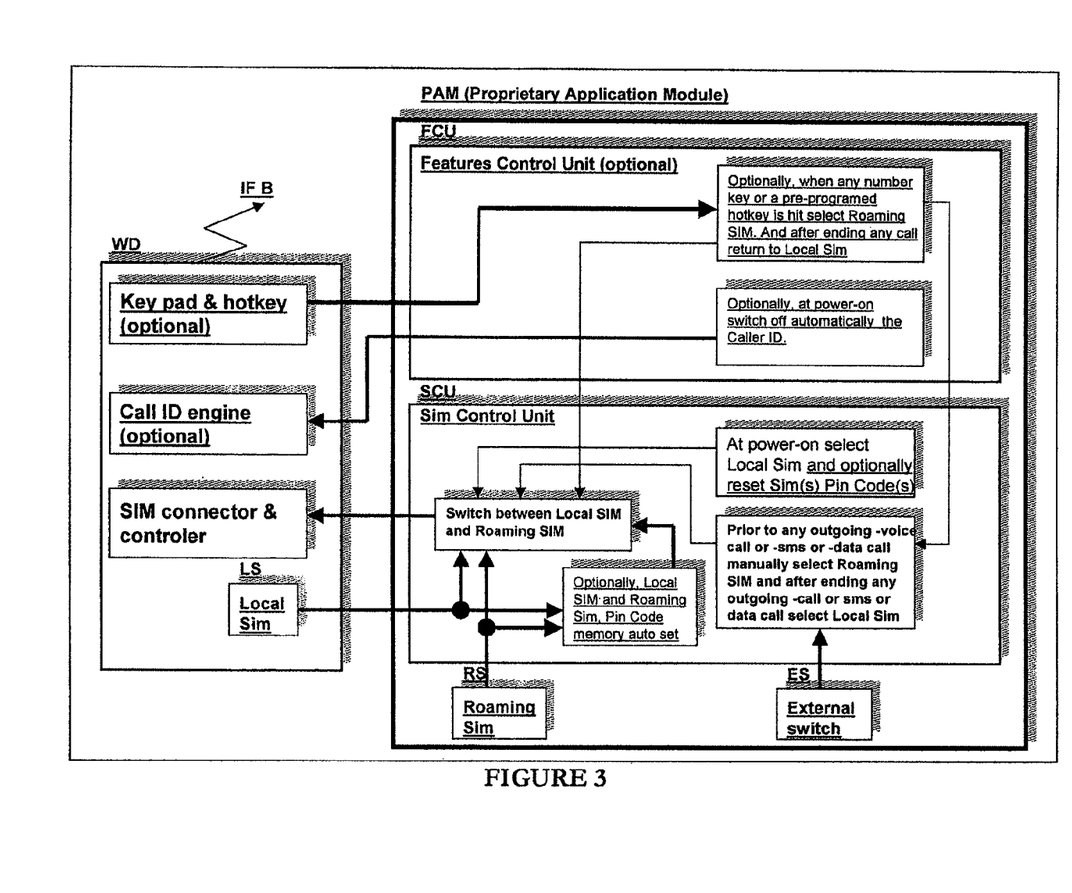
FIGS. 3 and 4 are example implementations with respect to the sub-modules of the proprietary application module (PAM).
Figure 4:
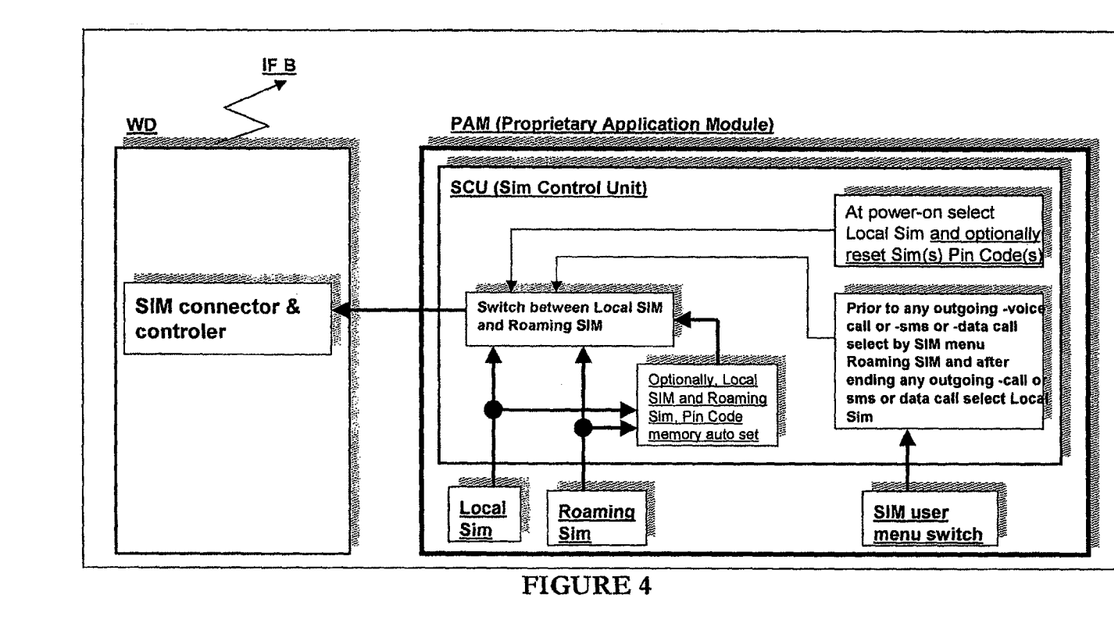

FIGS. 3 and 4 show two different preferred embodiments of the proprietary application module (PAM) of the invention, which in the context of the foregoing are self explanatory, basically showing some examples of the different combinations of PAM by combining its sub-modules respectively. In particular, the embodiment of the proprietary application module (PAM) of the invention as shown in FIG. 4 allows for the integration of the PAM within a single subscriber identity module (SIM) capable of handling at least two different identities, corresponding respectively to the LS and the RS as described above.

It should be clear from the preceding disclosures that the present invention provides a method and apparatus of interfacing and connecting a wireless device(s) and a wireless network(s) for in- and out-going traffic, such as SMS and/or voice and/or data call(s) routing. The principals, preferred embodiments and modes of operation of the present invention have been described in the claims, descriptions of implementation and drawings. This invention provides an advantage allowing any wireless device (WD) with a built-in proprietary applications module (PAM) and any wireless network (WN) to be interconnected through the existing wireless interfaces using any of the (at least two) SIM identities that declare different IMSI numbers, such as a Local SIM (LS) or Roaming SIM (RS). Moreover this invention provides an advantage allowing any wireless device with a built-in PAM to choose the call routing for both in- and out-going calls.

This ability to interconnect and communicate the LS and/or RS between the PAM and a wireless device (WD) (that includes the built-in PAM), with a wireless network (WN, WNn), is particularly advantageous for data and voice calls and optionally SMS routing. Freedom of choice of wireless networks is not readily possible with prior art approaches; but is fully in the hand of the end-user of any wireless network for any WD with a built-in PAM, that implements this invention.

The implementation of this invention and any variations and improvements, where the PAM(s) would reside in the wireless end-users wireless device(s) (WD), could in effect allow setting-up a "mobile virtual network operator" (MVNO), a "virtual telecoms operator" (VTO) or a "virtual telecoms provider" (VTP), thus introducing more competition in the wireless and/or cellular market place, greatly benefiting end-users, without the need for any wireless device and/or wireless handheld user to change its current Local SIM subscription (LS) with its current home wireless network operator in the country the end-user resides.

Instead, the end-user can benefit from the advantages of this invention by simply downloading or embedding a PAM, as described within this invention, within his wireless device (WD) and additionally subscribe to a Roaming SIM subscription (RS) with a so called roaming wireless network operator (RHWN) based in a country different from the country where he resides; the roaming wireless network operator must have an advantageous call tariff for roaming calls, and in particular a more advantageous call tariff for the end-user when originating calls with such RS from the country he resides in compared to calls tariffs when originating calls with his LS from the country he resides in.

This allows the end-user to keep his original phone number identity associated with the LS and the corresponding local home wireless network (LHWN) based in the country (Country A) where the end-user resides, whilst benefiting from the advantageous tariffs whenever applicable for his originated outgoing calls associated with the RS and the corresponding roaming home wireless network (RHWN) based in a country different from the previously mentioned (Country A). This applies if the end-user is in his home country, or even when he is in a different country. The latter is traditionally referred to as roaming, meaning the LS is roaming; in the embodiment of this invention the RS is almost always roaming, but does not have to be.

A practical example will illustrate this. Typically, the RHWN is associated with the RS and LS, each having their own unique IMSI; each embedded into the same single SIM. The IMSI of the LS is associated with the LHWN. The RHWN could be a small mobile network operator in a small country with limited growth potential, and therefore is more willing to provide call tariffs with smaller margins for international calls. The LHWN however provides in-country and international tariffs in line with market average, higher margins. This means that, for example, when switching to the RS for outgoing international calls, the cost to the WD user can be more advantageous as margins are kept more competitive, and still provide additional revenue to the smaller RHWN which it otherwise could not obtain. This allows revenue growth to the RHWN and more competitive lower pricing to the WD users. And in the case that the SIM with a built-in PAM, RS and LS is provided by a Mobile Virtual Network Operator (MVNO) to its WD users, it would allow the MVNO to compete even in the country of its own LHWN for international call tariffs, and definitely abroad when its WD users are roaming. This is an advantage that few or no other MVNOs have in the country of their own LHWN, allowing subscribers to this innovative MVNO to make use of any of the Wireless Networks, using the PAM and RS in their own devices; this will always ensure the best available wireless coverage.

The architecture as described herein, in as far as related to virtual networks, allows scalability where the Roaming SIMs (RS) can be the same for any country with whom the associated roaming wireless network has roaming agreements with, and where the tariffs for outgoing traffic are more advantageous in comparison to the tariffs of outgoing call tariffs with Local SIMs in such countries. This invention applies partly of fully, by simply substituting in each different country the Local SIM, as described within this invention, by the actual Local SIM (LS) identity of each individual end-user of such different country.

SUMMARY OF VARIOUS IMPLEMENTATION FEATURES

The following are each optional features of the preferred implementation.

The wireless device includes a proprietary applications module (PAM) capable of communicating with a Wireless Device (WD) and Wireless Network(s) through a wireless interfaces (IF-B).

WD and WDn are wireless devices and/or wireless handheld devices in any available current and future wireless technologies respectively, with a built-in PAM.

IF-B and IF-Bn are wireless interfaces in any available current and future wireless technologies respectively.

WN and WNn are wireless networks in any available current and future wireless technologies respectively.

Any individual or multiple PAM may be built-in into any WD or any such other wireless device, such as but not limited to so called "handsets", "handy", "mobile phones", "cellular phones", "wireless phones", "smart phones", "wireless devices", "wireless PC cards", "wireless modules"

Any individual or multiple PAM may include all of the following proprietary sub-modules or any single or multiple combination of these sub-modules (or an equivalent of each such sub-module(s) performing a similar function):

Sub-module; SIM Control Unit (SCU)
Sub-module; Features Control Unit (FCU)
Local SIM (LS)
Roaming SIM (RS)
External Switch (ES)

Any individual or multiple wireless device (WD) with a built-in PAM, may be capable of communicating with any Wireless Network (WN) through a wireless connection with a wireless or mobile network, or a first wireless connection with a wireless or mobile network and then through a second wireless and/or wired connection through a fixed network or switching network to an applications server, or a first wireless connection with a wireless or mobile network and then through a second wireless and/or wired connection through a voice over internet protocol network or server to an applications server.

The wireless device (WD), with a build-in PAM, is capable of communicating with the Local Home Wireless Network (LHWN) and/or any Local Wireless Network (LWN1, LWNn) through the SIM Control Unit (SCU) sub-module. This SIM Control Unit (SCU) is a sub-part of the PAM and allows the WD, with its built in PAM, to select either the Local SIM (LS) or Roaming SIM (RS) to, for example, provide the WD location update with the Wireless Network WN (example: LHWN and/or LWN) for incoming and/or outgoing traffic respectively.

The wireless device (WD), with a built-in PAM, is optionally capable of automatically modifying certain settings of the WD, through the Features Control Unit (FCU). The Features Control Unit (FCU) sub-module is optionally a sub-part of the PAM and allows the WD, through its built in PAM, to automatically modify the settings of the WD outgoing caller identification (caller ID) for any specific outgoing traffic and/or select the Roaming SIM when any number key is hit and/or when a pre-defined hotkey is hit for such function, for example to disable the outgoing caller ID of the WD for all outgoing-traffic.

The wireless device (WD), with a built-in PAM, is optionally capable of communicating with the Local Home Wireless Network (LHWN) and/or any Local Wireless Network (LWN1, LWNn) through the External Switch (ES) and the SIM Control Unit (SCU). The External Switch (ES), optionally a sub-part of the PAM, allows the WD through its built in PAM to select either the Local SIM (LS) or Roaming SIM (RS), to, for example, provide the location update to the wireless network WN (for example: LHWN and/or LWN) for incoming- and/or outgoing-traffic respectively.

The PAM can be built into a single SIM, where such single SIM provides all of the functions of at least one of each of a LS, RS and SCU. The PAM monitors the power supply provided by the WD, and at power-on selects, as a default, the LS. Optionally, the SCU will store, in its internal temporary memory, the PIN corresponding to its internal LS and RS respectively, such that when the SCU switches between its internal LS and RS, the user does not have to enter each time the corresponding PIN (except once after power-on of the WD). In the event this optional function is available within the SCU, then the SCU will at each power-on also reset the value of its internal PIN memory. The WD device user has the option to manually switch from the LS to the RS, through an external switch (ES) if available or through an internal user menu embedded in each of the LS and/or the RS and/or the single SIM. For example, the user can switch to the LS when the WD is in idle mode, allowing the WD to locate update to the WN with the LS identity and monitor for any incoming traffic assigned to the LS identity. And it can then switch to the RS, allowing the WD to locate update to the WN with the RS identity, prior to initiating some or all of the outgoing traffic assigned to the RS identity. Hence, when ending any outgoing traffic, the SCU will automatically, by means of an embedded user menu within each of the LS and RS and/or single SIM, or manually by the user activating the external switch (ES), revert back to the LS. This allows the WD to provide a location update to the WN with the LS identity and location and therefore receive incoming traffic and/or signalling assigned to the LS identity.

The SCU can monitor the power supply of the PAM, provided by the WD, and at power-on select as default the Local SIM (LS). Optionally, the SCU will store in its internal temporary memory the personal identification number (PIN) corresponding to the LS and RS respectively, such that when switching between the LS and RS, the user does not have to enter each time the corresponding PIN (except once after power-on of the WD and PAM). In the event this optional function is available within the SCU, then the SCU will at each power-on also reset the value of its internal PIN memory. The WD device user has the option to manually switch from the LS to the RS manually through an external switch (ES) or optimally through an internal user menu embedded in each of the LS and/or the RS. For example, the user can switch to the LS when the WD is in idle mode, allowing the WD to provide location updates to the WN with the LS identity and monitor for any incoming traffic assigned to the LS identity. But the user can then switch to the RS, allowing the WD to provide location updates to the WN with the RS identity, prior to initiating some or all of the outgoing traffic. But, when ending any outgoing traffic, the SCU can automatically (or manually by the WD user, by means of the external switch (ES)), switch back to the LS, thus allowing the WD to provide location updates to the WN with the LS identity and location; and hence receive incoming traffic and/or signalling assigned with the LS identity.

Any individual or multiple PAM may be stored in any storage device(s) and/or server(s) connected to any communications system(s), such as, but not limited to, so called "servers", "internet servers", "computers", "PCs", "media servers", "wireless switching exchanges", "fixed switching exchanges", "wireless network processors", "fixed network processor", "ATM network", "ADSL network", "DSL network", "internet servers", "intranet servers". From these storage/server devices, any current and/or future wireless device (and in particular any WD capable of downloading applications, for example GPRS, WAP, JAVA), can download a PAM or any evolution-, update-, upgrade-, modification- of the PAM.

Any individual or multiple PAM may be a part of any wireless device (WD), be it as software, firmware, hardware or a combination thereof which perform the same or an equivalent function.

Any such individual or multiple PAM may be activated or de-activated by the user of each individual WD.

Many modifications and variations of this present invention are possible in view of the above disclosures, drawings and explanations. Thus, it is to be understood that, within the scope of the appended claims, the invention can be practiced other than as specifically described above. The invention which is intended to be protected should not, however, be construed as limited to the particular forms disclosed, or implementation examples outlined, as these are to be regarded as illustrative rather than restrictive. Variations in changes could be made by those skilled in the art without deviating from the spirit of the invention. Accordingly, the foregoing detailed descriptions and drawings should be considered exemplary in nature and not limited to the scope and spirit of the invention as set forth in the claims.

The invention claimed is:

1. A SIM (Subscriber Identity Module) for a wireless device, the SIM adapted to include a downloadable software application module embodied on a non-transitory storage medium which includes at least a local SIM sub-module with a first International Mobile Subscriber Identity (IMSI) associated with a network operator based in country A and a second SIM sub-module with a different IMSI, which is associated with a network operator based in country B the SIM being switchable only in software between either of the sub-modules, wherein the SIM is physically packaged in the same package as a conventional SIM, in which a conventional SIM package always has just a single angled corner.

2. The SIM of claim 1 in which each sub-module is associated with a different IMSI and therefore a different network operator.

3. The SIM of claim 1 in which the first IMSI acts as a local SIM and the different IMSI acts as a roaming SIM.

4. The SIM of claim 1 adapted to include a downloadable proprietary application module (PAM) to control the switching between the sub-modules.

5. The SIM of claim 4, wherein each time a wireless device in which the SIM is located powers-on, the PAM selects the local SIM sub-module, which gives a location update to a home location register (HLR) attached to a local home wireless network (LHWN), which allows all incoming traffic to be associated with the local SIM sub-module.

6. The SIM of claim 4, wherein the PAM can switch from the local SIM sub-module to the second SIM sub-module; the second SIM sub-module then gives location updates to a visitor location register (VLR) attached to any available wireless networks (WN or WNn), associated with the second SIM sub-module.

7. The SIM of claim 6, wherein the PAM, after ending each originated outgoing traffic session using the second SIM sub-module, switches automatically back to the local SIM sub-module, which provides a location update to its home location register (HLR) attached to its local home wireless network (LHWN) when the wireless device is in its local SIM sub-module home country.

8. A conventional wireless device using just a single SIM including:

(i) the SIM (Subscriber Identity Module) adapted to include a downloadable software application module embodied on a non-transitory storage medium which includes at least a local SIM sub-module with a first International Mobile Subscriber Identity (IMSI) associated with a network operator based in country A, and a second SIM sub-module with a different IMSI which is associated with a network operator based in country B, the SIM being switchable only in software between either of the sub-modules, wherein the SIM is physically packaged in the same package as a conventional SIM, in which a conventional SIM package always has just a single angled corner;

(ii) and the downloadable software application module embodied on the non-transitory storage medium, to control the switching between the sub-modules of the SIM; and (iii) wherein the wireless device is connectable to a wireless network (WN) and connectable through existing wireless interfaces using either of the first IMSI or the different IMSI, without physically having to swap the SIM.

9. The wireless device of claim 8 which is one of the following: "handset", "handy", "mobile phone", "cellular phone", "wireless phone", "smart phone", "wireless device", "wireless PC card", "wireless module".

10. The wireless device of claim 8, adapted to perform communications with a mobile virtual network operator, virtual telecoms operator or a virtual telecoms provider, wherein the wireless device itself can be a mobile telephone, wireless card, smart phone or wireless module.

11. The wireless device of claim 8, adapted to be capable of communicating with any wireless network through a first wireless connection with a wireless network and then through a second connection to an applications server.

12. The wireless device of claim 8 where the application module has been downloaded into the SIM in the wireless device and wherein the application module had been stored in any storage device(s) or server(s) connected to any communications system(s), such as, but not limited to, so called "servers", "internet servers", "computers", "PCs", "media servers", "wireless switching exchanges", "fixed switching exchanges", "wireless network processors", "fixed network processor", "ATM network", "ADSL network", "DSL network", "internet servers", "intranet servers", and wherein from these storage/server devices, any current and/or future wireless device (and in particular any wireless device capable of downloading applications) can download the application module or any evolution-, update-, upgrade-, modification- of the application module to the wireless device.

13. A system including:

(i) a wireless device including a single SIM, the SIM further including a downloadable first software application module embodied on a non-transitory storage medium, the first software application module controlling switching between sub-modules in the single SIM, namely a local SIM sub-module part of the first software application module with a first International Mobile Subscriber Identity (IMSI) associated with a network operator based in country A, and a second SIM sub-module part of the first software application module with a different IMSI which is associated with a network operator based in country B; and (ii) an external switch sub-module part of a second software application module embodied on a non-transitory storage medium that is adapted to communicate with the wireless device;

wherein the external switch sub-module part of the second software application module controls the switching by the first software application module between the sub-modules of the single SIM.

14. The system of claim 13, wherein the application module controls a connection with any wireless network (WN) to be interconnected through existing wireless interfaces using either the first IMSI or the different IMSI.

15. The wireless device of claim 8, wherein an external switch controls selection of either SIM sub-module, and wherein the application module establishes data communication between the wireless device and a wireless network.

* * * * *